(12) United States Patent
Pantaloni

(10) Patent No.: US 9,536,187 B2
(45) Date of Patent: Jan. 3, 2017

(54) ATTACHMENT ASSEMBLY HAVING IDENTIFICATION CAPABILITY

(71) Applicant: NEOPOST TECHNOLOGIES, Bagneux (FR)

(72) Inventor: Jean-Baptiste Pantaloni, Ucciani (FR)

(73) Assignee: Neopost Technologies, Bagneux (FR)

( * ) Notice: Subject to any disclaimer, the term of this patent is extended or adjusted under 35 U.S.C. 154(b) by 0 days.

(21) Appl. No.: 14/755,676

(22) Filed: Jun. 30, 2015

(65) Prior Publication Data

US 2015/0379391 A1    Dec. 31, 2015

(30) Foreign Application Priority Data

Jun. 30, 2014    (EP) .................................. 14306055

(51) Int. Cl.
| | | |
|---|---|---|
| *G06K 19/06* | (2006.01) | |
| *G06K 19/077* | (2006.01) | |
| *F16B 1/00* | (2006.01) | |
| *G06K 7/10* | (2006.01) | |

(52) U.S. Cl.
CPC ........... *G06K 19/07758* (2013.01); *F16B 1/00* (2013.01); *G06K 7/10415* (2013.01); *G06K 19/07771* (2013.01); *F16B 2001/0035* (2013.01)

(58) Field of Classification Search
CPC .................. G06K 19/07779; G06K 19/07758; G06K 19/07749; G06K 19/0723; G06K 19/07771; G06K 7/10316; G06K 7/10366; G06K 19/07318; G06K 19/07745; G06K 19/07754; G06K 2017/0083; G06K 7/10415; G06K 9/209; F16B 1/00; F16B 2001/0035
See application file for complete search history.

(56) References Cited

U.S. PATENT DOCUMENTS

| | | | |
|---|---|---|---|
| 8,289,167 B2* | 10/2012 | Bauchot | G01C 15/04 340/568.2 |
| 2006/0289640 A1* | 12/2006 | Mercure | A01K 11/007 235/435 |
| 2010/0256535 A1* | 10/2010 | Novak | A61B 17/225 601/4 |
| 2011/0139877 A1* | 6/2011 | Szakelyhidi | G06K 19/07749 235/492 |

(Continued)

FOREIGN PATENT DOCUMENTS

| | | |
|---|---|---|
| DE | 10 2005 031 579 A1 | 1/2007 |
| DE | 20 2011 004 292 U1 | 10/2011 |
| EP | 2 474 941 A1 | 7/2012 |

OTHER PUBLICATIONS

European Search Report dated Dec. 9, 2014, for EP Application No. 14306055, 2 pages.

*Primary Examiner* — Thien T Mai
(74) *Attorney, Agent, or Firm* — Seed IP Law Group LLP

(57) ABSTRACT

An attachment assembly on a cylindrical protuberance of an article comprising a flexible cap configured for fitting an outer shape of the cylindrical protuberance, the flexible cap comprising an central recess part, a RFID tag fixedly mounted in the central recess part, the RFID tag comprising identification data relative to the article, and a magnet having two opposite flat faces, the magnet generating a magnetic field perpendicular to the flat faces being fixedly mounted by one of the two flat faces on the RFID tag and configured to be affixed by the opposite one of the two flat faces onto the cylindrical protuberance.

17 Claims, 1 Drawing Sheet

(56) References Cited

U.S. PATENT DOCUMENTS

2011/0253715 A1 10/2011 Phaneuf et al.
2014/0239076 A1* 8/2014 Chakravarty ........ G06K 19/041
   235/492

* cited by examiner

ATTACHMENT ASSEMBLY HAVING IDENTIFICATION CAPABILITY

FIELD OF THE INVENTION

The present invention relates to the identification of high value industrial articles e.g. metallic bars and more particularly to an attachment assembly having identification capability for tracking such articles to which this assembly can be affixed.

PRIOR ART

Today's business practices often require that industrial products be traced during the production and distribution phases and more particularly in the case of high value industrial articles. Generally, an identification data (ID) device attached to each industrial article is required. For productivity purposes, such an ID device needs to be read remotely and automatically by electronic interrogators. Automation also reduces errors in information capture and allows for more accurate and more regular inventory. This requires ID devices, which can communicate. Radiofrequency communication is a preferred solution as it allows a diffuse transmission and is tolerant to being hidden, as opposed to optical solutions, which are more directive and quite intolerant to blocking bodies in the transmission path. The use of RFID tags is an economical and efficient method for such systems.

An example of high value industrial articles to be traced are special metallic bars made of complex alloys, which may be used in the nuclear industry or the aeronautic industry or for automotive high performance such as for racing cars. Typically, these elongated metallic articles of small diameter (as small as 10 mm) are stored parallel on their sides on top of each other and they are transported in sheaves and are often shocked against each other's side while being handled. As a result, the ID device needs to be positioned at the cylindrical end of the metallic bar, which is the location on the bar which is less exposed to shocks against other bars. An additional constraint is that the metallic bar cannot be altered for affixing the ID device. In particular no machining or drilling can be performed on the end surface of the metallic bars. The end surface of the bar is smooth and must remain as such, therefore screwing the ID device into the bar or simply gluing the ID device on the bar is not appropriate. So, at present, no productive solutions are disclosed and there is a substantial need for such a solution that overcomes these drawbacks and additionally authorizes:

- the affixing of the ID device on the metallic bar quickly and simply to optimize the productivity of the industrial process,
- the easy removing of the ID device and its affixing mechanism when the metallic bar is used in its final production location, and
- the operating of the ID device and its affixing mechanism at least for a certain number of times.

The usage of flexible caps has been extensively tested, but such a solution proved to be insufficient for maintaining the ID device at the end of a bar.

SUMMARY

One object consists therefore in proposing an attachment assembly integrating an identification capability for all types of bars and operating during the year at all times and temperatures and that overcomes the above drawbacks. This is particularly important for bars with small diameters, which tend to flex more and make a flexible cap slip from the end of the bar. Also, the temperature impacts the mechanical performance of flexible caps that tend to be loosened when the temperature rises, for example during the summer.

To this end, the invention provides an attachment assembly for attaching on a cylindrical protuberance of an article, said attachment assembly comprising:

- a flexible cap configured for fitting an outer shape of said cylindrical protuberance, said flexible cap comprising a central recess part,
- a RFID tag fixedly mounted in said central recess part, said RFID tag comprising identification data relative to article,
- a magnet having two opposite flat faces, said magnet generating a magnetic field perpendicular to said flat faces and being fixedly mounted by one of said two flat faces on said RFID tag and configured to be affixed by the opposite one of said two flat faces onto said cylindrical protuberance.

With this configuration, it is possible to affix an identification on an article, for example at the end of a metallic bar, or on a screw or on an electrical connector of an article, and thereby to identify the article by reading remotely and automatically with electronic interrogators (even portable) the identification data of the RFID tag, which always and particularly under shocks remains in contact with the article due to the magnetic attraction force of the magnet.

Advantageously, said RFID tag is an on-metal UHF RFID tag.

Preferably, said flexible cap, said RFID tag and said magnet are glued together so as to form an inseparable assembly.

Advantageously, said flexible cap has a length corresponding to a determined mechanical gripping force sufficient for maintaining the RFID tag onto said cylindrical protuberance at its initial fastening and said magnet has a thickness corresponding to a determined magnetic attraction force sufficient for bringing back the RFID tag after a displacement of said flexible cap under shocks.

Preferably, said magnet has a thickness comprised between 3 and 12 mm corresponding to a static magnetic field between 300 and 600 milliTelsa in order to improve the RFID tag sensitivity.

According to a feature of the invention, said cylindrical protuberance made of magnetizable or non-conductive material has a diameter comprised between 10 and 90 mm, said flexible cap having a length in contact with the said metallic bar comprised between 5 and 40 mm, typically 5 mm for a metallic bar of 10 mm in diameter and 40 mm for a metallic bar of 90 mm in diameter and said magnet having a thickness comprised between 2 and 4 mm, typically 3 mm.

BRIEF DESCRIPTION OF THE DRAWINGS

Other aspects, features and advantages of the present teachings will become clearer to those ordinary skilled in the art upon review of the following description of a specific preferred embodiment of the invention in conjunction with the accompanying drawings where.

DETAILED DESCRIPTION OF EMBODIMENTS

The principle of the invention is to reinforce the gripping (i.e. mechanical friction forces) of a flexible cap that is insufficient for maintaining a RFID tag onto an elongated metallic article such as a bar of a small diameter, which can be as small as 10 mm, with the attraction force of a magnet. The cap elasticity ensures the initial fastening of the RFID tag onto the bar. However, when the bars are handled (and more particularly for small diameter bars, which flex significantly when they are handled), the friction phenomenon between bars tends to displace and ultimately remove the caps. In order to compensate for bar frictions and shocks, the invention adds a magnetic attraction force participating in securing the affixing of the RFID tag on the bar.

The first effect of the magnetic attraction force of the magnet is to cooperate with the mechanical gripping force of the flexible cap for maintaining the RFID tag in position onto the bar. The second effect of the magnetic attraction force is to bring back the RFID tag into position. This second effect is essential as shocks on the flexible cap may slightly displace the cap and the RFID tag. The magnetic back-moving force prevents these shock displacements to build up.

An additional benefit of the combination of a magnet with a flexible cap is that the magnet alleviates the diminishing gripping power of the flexible cap during its use. The effects of time, of temperature variation and of successive removals of the ID device from a bar tend to diminish the flexibility and the gripping power of the cap. On the other hand, the magnetic attraction remains stable in time, whatever the ambient temperature changes or the number of successive removals of the ID device from a bar.

Figure 1:
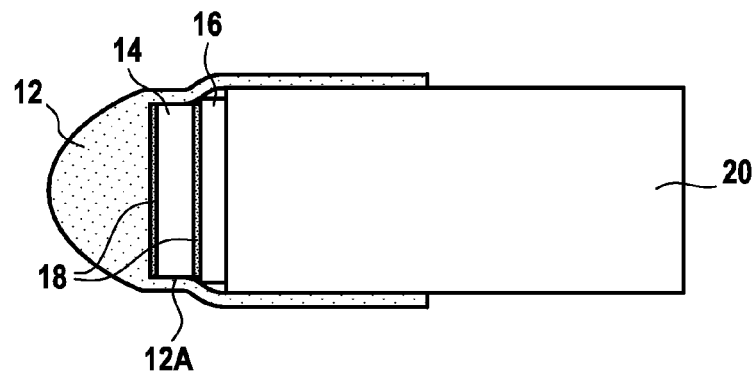
FIG. 1 shows a schematic view of the mechanical structure of an attachment assembly comprising a RFID tag according to the invention.

An attachment assembly for an end of an elongated metallic article according to the invention is illustrated on FIG. 1. The attachment assembly 10 comprises a flexible cap 12 configured for fitting an outer shape of the end of an elongated metallic article 20, the flexible cap comprising a central recess part 12A, a RFID tag 14 fixedly mounted in the central recess part, the RFID tag comprising identification data relative to the elongated metallic article, and a magnet 16 having two opposite flat faces, the magnet generating a magnetic field perpendicular to the flat faces and being fixedly mounted by one of the two flat faces on the RFID tag and configured to be affixed by the opposite one of the two flat faces onto the end of the elongated metallic article.

The flexible cap, the RFID tag and the magnet are preferably glued together so as to form an inseparable assembly, therefore allowing the assembly to be affixed onto any magnetizable material. More particularly, appropriate glue 18 is deposited on the two faces of the RFID tag to fixedly attach it first with the flexible cap 12 on the one hand and then with the magnet 16 on the other hand.

The flexible cap 12 is typically made of a thermoplastic or a thermosetting resin, the dimension of which being adapted to the shape of the end of the elongated metallic article on which it is mounted. More particularly, the length of the flexible cap defining a determined mechanical gripping force should be long enough to insure for a sufficient gripping contact surface with the bar. However, longer caps require a thicker structure, in particular so that it is possible to slide the cap onto the article. A thicker structure implies less elasticity, and therefore less gripping power. A thicker structure also implies a higher probability for friction and shocks with other bars, which increases the number of caps which are displaced and eventually removed from the bar. So, the optimization of the length of the flexible cap integrates the best compromise between gripping and elasticity.

The RFID tag 14 is an on-metal RFID tag (typically slotted RFID tag) operating in the Ultra High Frequency (UHF) band between 840 and 960 MHz and more particularly, in Europe, in the unique allotted band 866-869 MHz (the corresponding band in USA is 902-928 MHz). Due to the small diameter of some bars, the RFID tag dimensions must be limited. For example, for a bar of 10 mm of diameter, the typical size for the RFID tag is 8.6 mm×6.1 mm×2.1 mm corresponding to the reference Fit200® of the Omni-ID company. Obviously, other manufacturers can sell such small on-metal UHF RFID tags like Xerafy company with its Dot-On XS® product of a Φ6 mm×2.5 mm typical size.

The sensitivity of such small RFID tags is typically limited and they require to be affixed onto a conductive surface, whose dimension typically needs to be at least 3 times the dimension of the RFID tag. The sensitivity of these small tags decreases with the dimensions of the conductive surface on which they are affixed. For small bar diameters, the sensitivity of these small tags can become critical. In the case of the application for metallic bars, the metallic bar is used as an electric grounding for the antenna function of the RFID tag. It is therefore necessary that the affixing mechanism maintains the RFID tag so that it remains electromagnetically connected with the metallic bar. Typically, the distance between the RFID tag and the metallic grounding surface must be lower than 0.5 mm.

The magnet 16 must be placed between the RFID tag 14 and the end surface of the metallic bar 20. The magnet size, i.e. its thickness defining a determined magnetic attraction force, should be minimal for minimizing the size of the cap and the probability of shocks, but it should also be large enough to ensure for an efficient magnetic back-moving force. In the particular case of the metallic bars, optimized values for the magnet thickness are between 2 mm and 4 mm for Neodyme magnets of 10 mm diameter (S-10-03-N type of the Supermagnete Company). Indeed, if the gripping of the cap is too strong, the magnetic may not be able to bring back the RFID tag in position after a displacement of the cap and the RFID tag. So, these considerations are also integrated for the optimization of the length of the flexible cap. For example, for a metallic bar of 10 mm in diameter, the typical size of the length of the cylindrical part of the flexible cap in contact with such a bar is 5 mm and this length is 40 mm for a bar of 90 mm in diameter.

Figure 2:
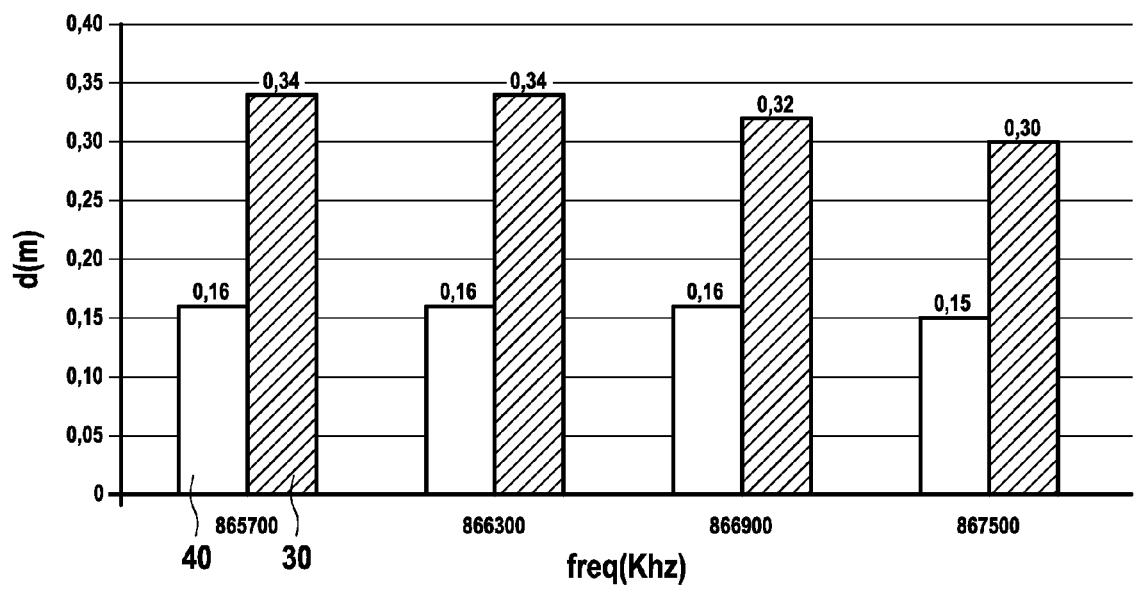
FIG. 2 is a diagram showing for four different frequencies the reading distance of the RFID tag depending on the presence or not of a magnet in the attachment assembly of FIG. 1.

During the project investigations, the inventors have established that the magnet impacts the electromagnetic interaction between the RFID tag and a metallic support and improves the RFID tag sensitivity, rather than disturbing it. In the particular case of a metallic bar of 10 mm diameter the insertion of an appropriate magnet (typically a Neodyme S-10-03-N of the Supermagnete Company—3 mm thick) improves the sensitivity by a factor of about 4, as illustrated on FIG. 2, which shows for different frequencies the reading distance with (reference 30) and without (reference 40) this magnet. As a result, the electronic interrogator can be positioned twice further away from the RFID tags. This surprising improvement is extremely beneficial as the sensitivity of small RFID tags affixed on a limited metallic surface is quite low as explained before. For example, magnets having a thickness comprised between 3 and 12 mm and corresponding to static magnetic fields between 300 and 600 milliTelsa, all provide an improvement the RFID tag sensitivity. With an improved sensitivity, it is then possible to use a handheld RFID antenna/detector in lieu of a classical electronic interrogator, which can communicate with all the RFID tags positioned at the end of the metallic bars that are handled in sheaves. Moreover, thanks to the insertion of the magnet, the attachment assembly can operates even if the protuberance is not metallic, nor conductive.

It must be noted that the combination of the magnet with the flexible cap is necessary. As explained above, the gripping of a flexible cap is insufficient for maintaining the tag onto the bar. The usage of a magnet by itself is also insufficient. A magnet is ineffective to center correctly the RFID tag on the center of the end surface of the bar. A shock may easily displace the magnet off the center of the end surface of the bar. Additionally, a magnet, which is not guided by a flexible cap, may be attracted by another metallic bar, and end up affixed onto the wrong bar.

The invention is therefore particularly suitable for elongated metallic objects of small diameter. However, the invention also applies to metallic screws, which could be part of any kind of product, or to electrical connectors of any type of equipment. In fact, the invention applies to any cylindrical protuberance made of magnetizable material or not (including non-conductive material) as explained previously, whose section fits the dimensions of the attachment assembly integrating the RFID tag.

The invention claimed is:

1. An attachment assembly for attaching on a cylindrical protuberance of an article, said attachment assembly comprising:
   a flexible cap configured for fitting an outer shape of said cylindrical protuberance, said flexible cap comprising a central recess part,
   an RFID tag fixedly mounted in said central recess part, said RFID tag comprising identification data relative to said article,
   a magnet having two opposite flat faces, said magnet generating a magnetic field perpendicular to said flat faces and being fixedly mounted by one of said two flat faces directly on said RFID tag and configured to be affixed by the opposite one of said two flat faces onto said cylindrical protuberance.

2. An attachment assembly according to claim 1, wherein said RFID tag is an on-metal UHF RFID tag.

3. An attachment assembly according to claim 2, wherein said flexible cap, said RFID tag and said magnet are glued together without any intervening structures and form an inseparable assembly.

4. An attachment assembly according to claim 1, wherein said cylindrical protuberance is made of conductive material.

5. An attachment assembly according to claim 1, wherein said cylindrical protuberance is made of magnetizable material.

6. An attachment assembly according to claim 1, wherein said magnet has a thickness corresponding to a determined magnetic attraction force sufficient for bringing back the RFID tag after a displacement of said flexible cap under shocks.

7. An attachment assembly according to claim 1, wherein said magnet has a thickness comprised between 3 mm and 12 mm corresponding to a static magnetic field between 300 and 600 milliTelsa in order to improve the RFID tag sensitivity.

8. An attachment assembly according to claim 1, wherein said cylindrical protuberance is a metallic bar having a diameter comprised between 10 mm to 90 mm.

9. An attachment assembly according to claim 8, wherein said flexible cap is designed so that the length of the cylindrical part of the flexible cap in contact with the said cylindrical protuberance is comprised between 5 mm for a metallic bar of 10 mm to 40 mm for a metallic bar of 90 mm.

10. An attachment assembly according to claim 9, wherein said magnet has a thickness comprised between 2 mm and 4 mm.

11. An attachment assembly according to claim 1, wherein said flexible cap, said RFID tag and said magnet are glued together so as to form an inseparable assembly.

12. An attachment assembly to attach on a cylindrical portion of an article, said attachment assembly comprising:
    a flexible cap having a recess, the recess sized and dimensioned to selectively receive said cylindrical portion of said article;
    a wireless transponder fixedly mounted in said central recess of the flexible cap;
    a magnet having a first face and a second face, the second face opposed across a thickness of the magnet from the first face, said magnet having a magnetic field, at least a portion of which is perpendicular to the first and the second faces of the magnet;
    a first adhesive layer that fixedly secures the first face of the magnet directly to the wireless transponder with no intervening structure therebetween, with the second face of the magnet disposed to contact the cylindrical portion of the article when said flexible cap is positioned on said article with the cylindrical portion received by said recess of said flexible cap.

13. An attachment assembly according to claim 12, wherein said wireless transponder is an on-metal UHF RFID tag and said RFID tag stores identification data that identifies said article.

14. An attachment assembly according to claim 12, further comprising:
    a second adhesive layer that fixedly secures the wireless transponder directly to the flexible cap with no intervening structure therebetween, wherein said flexible cap, said wireless transponder and said magnet are glued together without any intervening structures and form an inseparable assembly.

15. An attachment assembly according to claim 12, wherein said magnet has a thickness corresponding to a determined magnetic attraction force sufficient to bring said wireless transponder RFID tag back after a displacement of said flexible cap under shock.

16. An attachment assembly according to claim 12, wherein said magnetic field is a static magnetic field between 300 and 600 milliTelsa.

17. An attachment assembly according to claim 12, wherein said magnet has a thickness comprised between 2 mm and 4 mm.

* * * * *